Feb. 3, 1925.
A. JOLICOEUR
BEATER
Filed April 3, 1924   2 Sheets-Sheet 1
1,525,394
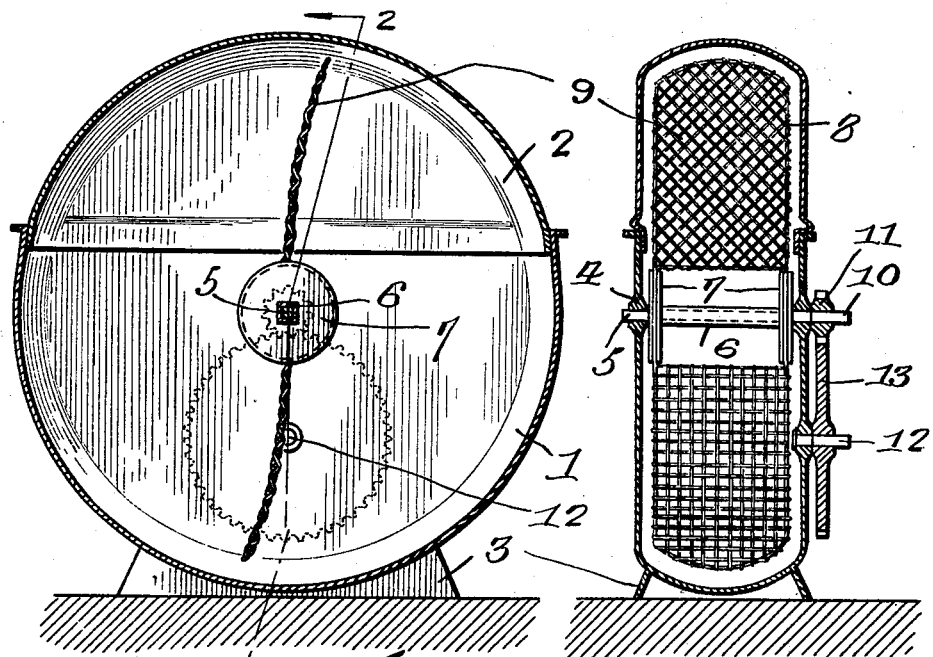
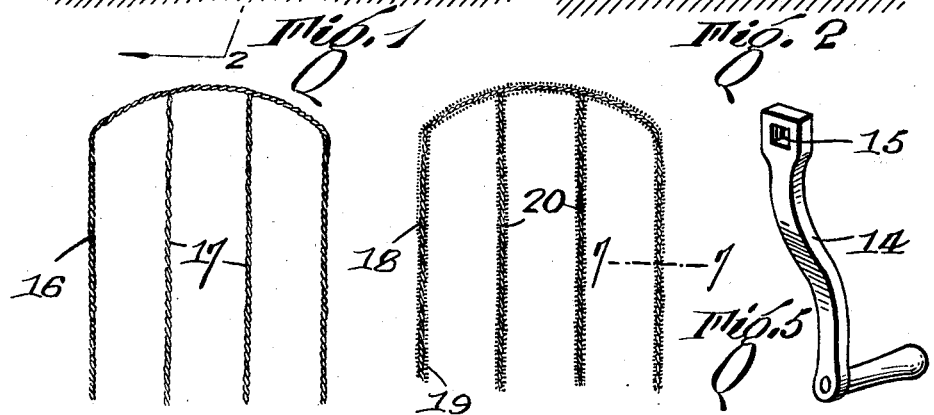
Inventor
Alderic Jolicoeur
By William C. Linton
Attorney

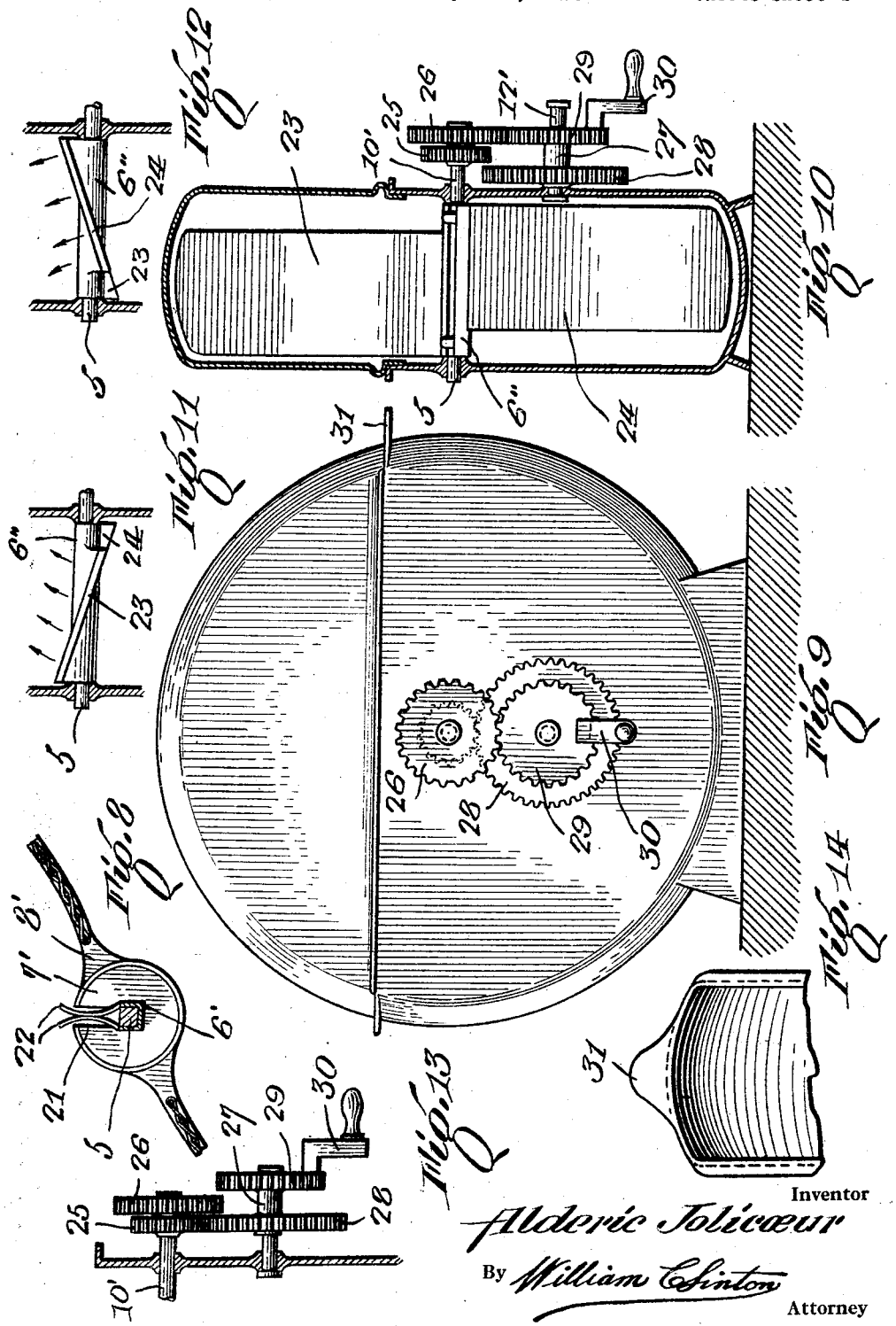

Patented Feb. 3, 1925.

1,525,394

UNITED STATES PATENT OFFICE.

ALDERIC JOLICOEUR, OF MONTREAL, QUEBEC, CANADA.

BEATER.

Application filed April 3, 1924. Serial No. 704,066.

*To all whom it may concern:*

Be it known that I, ALDERIC JOLICOEUR, a subject of the King of Great Britain, residing at Montreal, Province of Quebec, Canada, have invented certain new and useful Improvements in Beaters; and I do hereby declare that the following is a full, clear, and exact description of the invention, such as will enable others skilled in the art to which it appertains to make and use the same.

The present invention pertains to a novel beater designed particularly for rendering liquid food substances lighter.

The principal object of the invention is the provision of a device of this character which is of simple construction and efficient in operation. To this end, the device comprises an arrangement whereby it may be turned at a given speed until the substance therein is partially lighter, and substantially increased in speed to complete the operation. With this object in view, the device comprises a casing in which is mounted a shaft carrying two or more beater frames. One end of this shaft is squared for application of a handle and also carries a pinion. In the casing is journaled a stub shaft carrying a relatively large gear meshing with the pinion. The stub shaft is also adapted for application of the handle. In starting the device, the main shaft is turned, and the speed is substantially increased as pointed out above by removing the handle therefrom and applying it to the stub shaft which carries the larger gear.

Still another object of the invention is the provision of a device for cleaning the machine after use. This member comprises U-shaped frames which may be substituted for the beating frames mentioned above. Each of these frames is formed of twisted wires between which are disposed a number of bristles. Within the frame are placed longitudinal members constructed in the same manner, that is, having a pair of twisted strands and bristles held therebetween.

The invention is fully disclosed in the following description and in the accompanying drawings in which:

Figure 1 is a vertical longitudinal section of the device;

Figure 2 is a section on the line 2—2 of Figure 1;

Figure 3 is a detail of another form of beater;

Figure 4 is a detail of a device for washing the machine;

Figure 5 is a perspective view of the operating handle;

Figure 6 is an enlarged detail of the device shown in Figure 4;

Figure 7 is a section on the line 7—7 of Figure 4;

Figure 8 is a detail showing a modified construction for attaching the frame to the shaft;

Figure 9 is a side elevation of a modified form designed for stirring ice cream;

Figure 10 is a transverse vertical section thereof;

Figure 11 is an end view of one of the vanes;

Figure 12 is a similar view of the other vane;

Figure 13 is a detail of Figure 10, showing the gears shifted; and,

Figure 14 is a fragmentary elevation showing the lip on the body of the cylinder.

Reference will now be had to these views by means of like characters which are employed to designate corresponding parts throughout.

The device comprises a cylinder 1, the top portion 2 of which is removable to permit access to the interior. The cylinder is mounted on a base 3 so that it can be supported on any level surface.

At the centres of the bases of the cylinder are formed bearings 4 as shown in Figure 2. In the bearings is supported a shaft 5, the ends of which are obviously round for accommodation in the bearings, while the central portion thereof is squared for the purpose pointed out below. On the squared portion is mounted a sleeve 6 also interiorly squared so that it will not turn relatively to the shaft. The sleeve carries grooved discs 7 at its ends. These discs serve to support a pair of U-shaped frames 8, the ends of which are secured to the discs as shown in Figures 1 and 2. Intersecting wires 9 are laid across the frames forming a network which is suitable for beating light substances such as eggs and cream.

One end of the shaft 5 is extended as at 10, this extension being also squared and carrying a pinion 11. Journaled in one of the bases of the cylinder is a stub shaft 12 carrying a relatively large gear 13 meshing with the pinion 11. The outer end of the shaft 12 is also squared.

For operating the device, there is provided a handle 14 having a square socket 15 adapted to receive the squared portions of either member 10 or 12. In the use of the machine, the removable part 2 is first raised so that the material may be inserted. The handle 14 is then applied to the squared part of the extension 10 and turned until considerable speed is developed or until the material has become comparatively lighter. The handle is now removed and applied to the squared shaft 12 which permits a greater speed due to the fact that the gear 13 is larger than the pinion 11.

For beating thicker materials, such as in making pastry, the U-shaped frames consist of twisted wires 16 and longitudinal members 17 of similar construction disposed within the frames as shown in Figure 3.

In Figure 4 is illustrated a device for washing the machine. This also consists of U-shaped frames secured to the discs 7. Each frame consists of a pair of twisted strands 18 between which are inserted short bristles 19. Elongated members 20 of similar construction are mounted longitudinally within the frame in the same manner as the members 17 of Figure 3.

Figure 8 shows a modified construction for attaching the beater frame to the shaft. In this construction the discs 7' are slotted as at 21, and the sleeve 6' has only three sides. The sides of the frames 8' may be formed integral with the discs. Over the open side of the sleeve are placed a pair of contacting springs 22. The device is applied to the square shaft 5 by pressing the springs thereagainst, so that they engage opposite sides of the shaft. The pressure is maintained until the shaft rests in the sleeve, at which time the springs make contact with one another as shown in Figure 8 and thus retain the device upon the shaft.

The embodiment shown in Figures 9 and 14 is designed especially for stirring ice cream. In this modification the sleeve 6'' is round as shown in Figures 11 and 12 but is square interiorly for accommodation on the shaft 5. The beater frames are dispensed with and replaced by vanes 23 and 24 which are disposed in a plane angular to the axis of the shaft as shown in Figures 11 and 12. Since the vanes are disposed at opposite sides of the centre of rotation, both tend to throw the beaten substance inwardly with respect to the cylinder. Thus the vanes 23 will throw the material in a given direction as shown by the arrows in Figure 11, while the other vane will throw it in the opposite direction as shown by the arrows in Figure 12.

The extension 10' of the shaft 5 carries a pinion 25 and a gear 26. The stub shaft 12' is round as distinguished from the square shaft 12 of Figure 2. On the shaft is slidably mounted a sleeve 27 carrying a gear 28 for engagement with the pinion 25 and a smaller gear 29 for engagement with the gear 26. To the face of the gear 29 is secured an operating crank 30. The machine is started with the gears 26 and 29 in engagement as shown in Figure 10. As the inertia is overcome, the sleeve 27 is shifted so that the gear 28 meshes with the pinion 25 whereby a higher velocity is obtained.

The edge of the body of the cylinder is provided with a flat lip 31 to facilitate pouring out the contents when the stirring operation is completed.

While specific embodiments of the invention have been illustrated and described, it is to be understood that various alterations in the details of construction may be made without departing from the spirit of the invention as indicated by the appended claims.

Having thus fully described the invention, what I claim as new and desire to protect by Letters Patent is:—

1. A beater comprising a cylinder, a shaft mounted axially therein, a pair of spaced discs carried by the shaft, beater frames having their ends secured to the peripheries of said discs, and wires stretched across said frames.

2. A beater comprising a cylinder, a shaft mounted axially therein, a sleeve carried by said shaft, a pair of discs secured to the ends of said sleeve, U-shaped frames having their ends secured to said discs, and wires stretched across said frames.

3. A beater comprising a cylinder, a shaft mounted axially therein, a pair of spaced discs carried by the shaft, U-shaped frames having their ends secured to the peripheries of said discs, wires stretched across said frames, said shaft having a squared extension and a pinion secured thereto, a stub shaft secured to a base of the cylinder and having a squared extension, and a gear mounted on said stub shaft and meshing with the pinion.

4. A beater comprising a cylinder, a shaft mounted axially therein, a sleeve carried by said shaft, a pair of discs secured to the ends of said sleeve, U-shaped frames having their ends secured to said discs, wires stretched across said frames, said shaft having a squared extension and a pinion secured thereto, a stub shaft secured to a base of the cylinder and having a squared extension, and a gear mounted on said stub shaft and meshing with the pinion.

In witness whereof I have hereunto set my hand.

ALDERIC JOLICOEUR